Sept. 23, 1952          H. J. CARLIN          2,611,795
POWER MEASURING BRIDGE
Filed Nov. 15, 1948                         2 SHEETS—SHEET 1
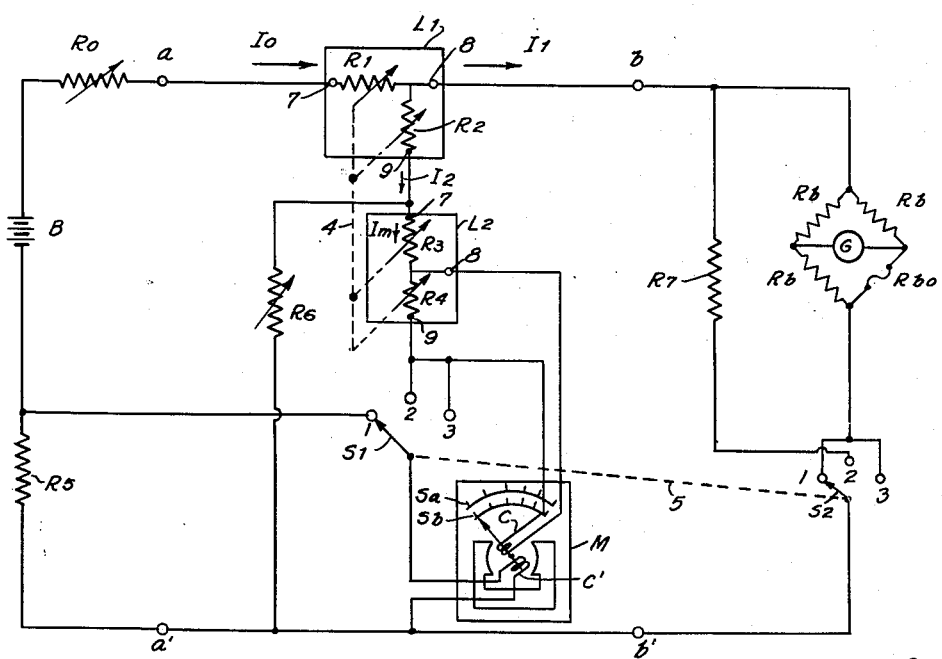
Fig. 1.
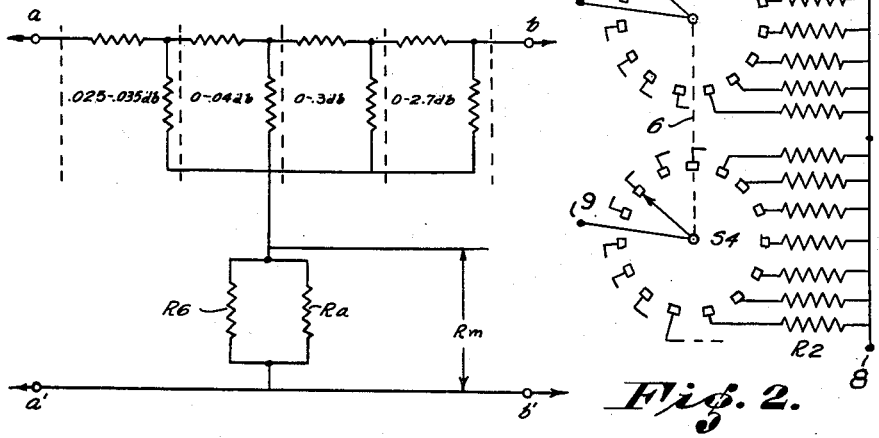
Fig. 3.          Fig. 2.
Inventor
HERBERT J. CARLIN
By Ralph B. Stewart
ATTORNEY Patented Sept. 23, 1952

2,611,795

UNITED STATES PATENT OFFICE 2,611,795

POWER MEASURING BRIDGE

Herbert J. Carlin, East Orange, N. J., assignor to Polytechnic Institute of Brooklyn, Brooklyn, N. Y., a corporation of New York Application November 15, 1948, Serial No. 60,037

9 Claims. (Cl. 171—95)

This invention relates to a bridge for the measurement of electric power, and especially for the measurement of power in the high frequency or microwave range.

The invention involves the use of a Wheatstone bridge in which a bolometer element forms one arm, and the bridge is of the "balanced" type.

The main object of the invention is to devise a power measuring bridge in which the power is indicated directly in terms of microwatts, milliwatts, or watts by a direct current indicating instrument.

In my bridge arrangement, the entire operating current for the bridge is supplied from a direct current battery, thus eliminating the use of an audio frequency oscillator and a rectified power supply. The presence of cross-product terms in the expression for incremental power is taken into account by a specially devised circuit arrangement which permits the measurement of replacement power by a direct reading D. C. instrument.

The present invention has already been described in an article entitled "A Direct Reading D-C Bridge for Microwave Power Measurements," published in the "Transactions of the American Institute of Electrical Engineers," volume 67, 1948, section T-847.

My invention is illustrated in the accompanying drawing in which

Figure 1 is a schematic circuit diagram showing one form of the power measuring bridge;

Figure 2 is a schematic diagram illustrating one form of L-pad which may be used in Figure 1;

Figure 3 is a simplified circuit diagram useful in explaining the operation of Figure 1;

Figure 4:
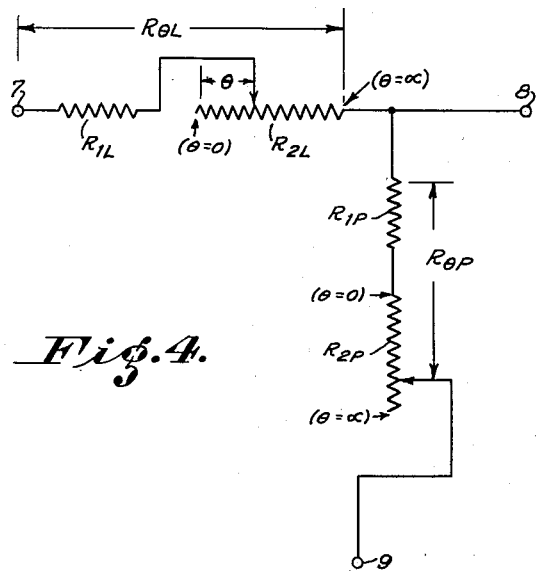
Figure 4 is a schematic diagram illustrating another form of L-pad useful in the power measuring bridge.

Referring to Figure 1, a Wheatstone bridge is formed of three arms $Rb$, $Rb$, $Rb$, preferably of equal resistance, and a fourth arm includes a bolometer element $Rbo$. The bridge is provided with a null indicating instrument G connected across diagonal points. Biasing current is supplied to the other diagonal points of the bridge from a battery B, through a variable resistor $Ro$ and through a pair of lines including a constant input resistance network having a pair of input terminals $a$, $a'$ and a pair of output terminals $b$, $b'$. The battery circuit also includes a series resistor R5 to be explained later. Network terminals $a'$ and $b'$ are connected together, while the series arm R1 of a constant impedance attenuator pad L1 is connected between terminals $a$ and $b$. The shunt arm R2 of the L-pad L1 is connected to the series arm R3 of a second constant impedance attenuator L-pad L2 which supplies one coil $c$ of a double coil indicating instrument M, and the shunt arm R4 of this pad is connected to terminals 2 and 3 of a three-point switch S1. The shunt circuit of the attenuator pad L1 is completed from the movable contact of the switch S1 through the second coil $c'$ on the meter M to the output terminal $b'$ of the network. A calibrating shunt resistor R6 is connected between the input terminal of attenuator pad L2 and the input terminal $a'$ of the network. The load attenuator L1 and the meter attenuator L2 are ganged together for simultaneous operation as indicated by the dotted line 4.

The output terminal $b'$ of the attenuating network is connected to the movable contact of a second three-point switch S2 which, in positions 1 and 3, connects the terminal $b'$ to the Wheatstone bridge, and in the second position of the switch, the terminal $b'$ is connected to a fixed resistor R7 having a value equal to the resistance of the bridge when balanced. Switches S1 and S2 are ganged together for simultaneous operation as indicated by the dotted line 5.

Switch S1 in its first position connects the coil $c'$ of meter M in shunt with series resistor R5 so that the meter may be used to measure the value of the current $I_0$ supplied from the battery to the constant impedance network.

Figure 2 shows one suitable construction for each of the L-pads L1 and L2.

As applied to pad L1, the series arm R1 is formed of a number of fixed resistors connected to the contacts of a multiple-point switch S3, the movable contact of which is connected to the terminal $a$. The shunt arm R2 of the L-pad is also formed of a series of fixed resistors connected to the contacts of a second multiple-point switch S4, the rotary arm of which is connected to resistor R6 and to pad L2. The two switches S3 and S4 are mechanically coupled for simultaneous operation as shown by the dotted line 6, and the resistors have selected values such that the input impedance of the pad remains constant as the attenuation is varied. The L-pad L2 is similarly constructed to obtain the proper ganging between the series and shunt arms. As already explained, the two pads L1 and L2 are mechanically coupled for simultaneous operation such that the attenuation of the pad L1 is always the same as that of the pad L2 for any given setting.

The meter M is provided with a pair of scales $Sa$ and $Sb$. Scale $Sa$ is a squared scale for indicating the squared value of $I_0$, and the scale $Sb$ is a linear power scale for indicating the radio frequency power in suitable units such as microwatts or milliwatts.

Before explaining the procedure in using the arrangement shown in Figure 1, some discussion of the theory of the arrangement will be given.

The total power dissipated in the bolometer at balance is fixed for a given bolometer. If the bridge is balanced by D.-C. power alone, and R.-F. power is then introduced into the bolometer, the R.-F. power is equal to the amount by which the D.-C. power must be reduced in order to effect a rebalance. Thus if the D.-C. bolometer current required for balance when R.-F. power is absent is $I_0/2$, referred to as the bias current, and $I_1/2$ is the D.-C. bolometer current present at the rebalance after the addition of microwave power, the microwave power $P_{rf}$ is $$P_{rf}=\frac{R_b}{4}(I_0^2-I_1^2) \qquad (1)$$

This expression may be evaluated by determining $I_0$ and $I_1$ and subtracting their squares. A method like this suffers, however, from extreme inaccuracy when the power to be measured is small compared to the bias power, for then $I_1$ differs only slightly from $I_0$. Equation 1 may be rewritten as $$P_{rf}=\frac{R_b}{4}I_0\left(1+\frac{I_1}{I_0}\right)(I_0-I_1) \qquad (2)$$

When the D.-C. power to the bridge is attenuated by the four terminal, constant input resistance network connected between the terminals $a$, $a'$ and $b$, $b'$ in Figure 1, so that the battery loading is constant, independent of attenuation, then the difference, $(I_0-I_1)$, in Equation 2 is the current flowing in the shunt branch of the attenuator. The sum factor, $(1+(I_1/I_0))$, is a parameter of the attenuator alone. Let $$\frac{I_1}{I_0}=k, \text{ and } I_0-I_1=I_2$$

Equation 2 becomes $$P_{rf}=\frac{R_b I_0}{4}(1+k)I_2 \qquad (3)$$

The line current, $I_0$, is fixed for a given bolometer. $R_b$ is the resistance of the bridge at balance. The microwave power is therefore linearly proportional to $(1+k)I_2$.

The value of $kI_2$ is determined by the network which includes the attenuator L2 terminated by the low resistance meter M and inserted in the shunt branch of the load attenuator L1. As already explained, L2 and L1 are ganged for simultaneous operation so that the "$k$" factor of both are equal for any given setting. The current $I_2$ could be measured by a separate ammeter in the shunt arm of the pad L1, but rather than use two ammeters to obtain $I_2+kI_2$, the double coil meter M is employed which indicates the sum of the currents directly.

To make this instrument direct reading it is necessary to introduce the proportionality factor $R_b I_0/4$. This constant varies with individual bolometers due to manufacturing variations which preclude the same bias for each unit. The factor is essentially a meter scale constant and is calibrated for each bolometer by means of a variable shunt R6 across the double coil ammeter. If the face calibration of the meter is $W\mu w/ma$, and $P_B$ is the ratio of the current in the meter $I_m$, to the branch current $I_2$, and if the meter is to read the power, the following must be true:

$$P_B W = R_b I_0/4 \qquad (4)$$

The meter attenuator L2 must be a constant impedance network in order that $P_B$ be constant for all attenuator settings. A simple method for adjusting R6 so that Equation 4 is true for any specific bolometer is described later on.

The arrangement shown in Figure 1 is employed for the measurement of high frequency power in the following manner. With no radio frequency applied to the bridge, the switches S1 and S2 are moved to the first position in which the meter coil $c'$ is connected in shunt to resistor R5. Resistor R0 is now adjusted until the bridge is in a balanced condition as shown by the indicator G, and the reading $I_0^2$ is noted on scale $Sa$ of meter M.

Switches S1 and S2 are now moved to the second position to connect the meter coils $c'$ in the shunt circuit of the pad L1 and to substitute resistor R7 for the bridge. The two pads L1 and L2 are now adjusted to the value $k_0$ which is the attenuation factor which would be necessary to balance out high frequency power of magnitude $I_0^2$ corresponding to the meter reading previously noted on scale $Sa$, if such high frequency power were applied to the bolometer. $k_0$ is a fixed quantity independent of the bias current of the bolometer being used, for note that $P_{rf}$ from Equation 3 may be written:

$$P_{rf}=\frac{R_b I_0^2}{4}(1-k^2) \qquad (5)$$

and $k_0$ is the number required to make the factor $$\frac{R_b}{4}(1-k^2)$$

of Equation 5 equal to unity. Resistor R6 is now varied until the meter M returns to the same position on the linear scale $Sb$ as previously noted on the square scale $Sa$, and this completes the calibration of the circuit, for since the power scale is linear, making the instrument read correctly at one point calibrates the entire range.

Switches S1 and S2 are now moved to position 3, and radio frequency energy is now applied to the bolometer element, and the bridge is rebalanced by adjusting the pads L1 and L2 until the indicator G returns to zero. The radio frequency power is now indicated directly by the meter M on the scale $Sb$ which is a linear scale.

Instead of setting the dials of L1 and L2 so that $k=k_0$, a preset fixed group of four resistors adjusted to give $k_0$ may be switched into the circuit whenever the $k_0$ calibration is required.

In actual practice it has been found that a Wollaston wire element may be used as the bolometer element for low power measurements up to one milliwatt, and a metallized glass element is useful for high power measurements, say from 10 milliwatts to 100 milliwatts. A range of attenuation from 0.03 db to 3.0 db is needed to cover this power range. In order that accurate tracking be maintained between the load and meter attenuators, and that the two input impedances remain very nearly constant for all settings, it is advisable to design the attenuators as cascaded units as shown in Figure 3. The attenuations of the units are 0–2.7 db in 0.3 db steps, 0–0.3 db in 0.05 steps, 0–.05 db in 0.01 steps and 0.025–0.035 db in 0.001 db steps. The lowest steps of attenuation result in at most 1 microwatt steps for the low power bolometers and 1 milliwatt steps for the high power bolometers.

It is also preferable that the meter attenuator L2 be formed of a cascade of L-pads. This is not specifically shown in Figure 3, but the combined resistance of the attenuator L2 and the meter M is represented by the resistor $Ra$, and able arms on variable resistors $R_{2L}$ and $R_{2P}$ are coupled for simultaneous operation so that when $R_{oL}$ is increased, $R_{oP}$ is decreased and vice versa, and in such manner as to maintain a constant input impedance. It will also be understood that the movable arms of the variable resistors included in the L2 pad will be coupled for simultaneous operation with the movable arms of the variable resistors included in the L1 pad.

The following table will give the values of resistors $R_{1L}$, $R_{1P}$, and the maximum values of variable resistors $R_{2L}$ and $R_{2P}$ for two different power ranges of the bridge:

|  | Main Bridge | L-Pad | Instrument | L-Pad |
| --- | --- | --- | --- | --- |
| Power Ranges | 20–100 μw | over 100 μw | 20–100 μw | over 100 μw |
| $R_{1L}$ | 0.626 | 3.35 | 0 | 1.00 |
| $R_{2L}$ | 4.37 | 55.2 | 0 | 16.6 |
| $R_{oL}$ | $5\epsilon^{-2.07\,\theta/\alpha}$ | $58.6\epsilon^{-2.86\,\theta/\alpha}$ | 0 | $17.6\epsilon^{-2.86\,\theta/\alpha}$ |
| $R_{1P}$ | 7.800 | 482 | 2,340 | 144.6 |
| $R_{2P}$ | 56.000 | 11,240 | 16,800 | 3,385 |
| $R_{oP}$ | $200\,(40\epsilon^{2.07\,\theta/\alpha}-1)$ | $200\,(3.41\epsilon^{2.86\,\theta/\alpha}-1)$ | $60\,(40\epsilon^{2.07\,\theta/\alpha}-1)$ | $60\,(3.41\epsilon^{2.86\,\theta/\alpha}-1)$ | the combined resistance of R6 and $Ra$ is represented by $Rm$.

It is important that the deviation of the input impedance from $Rb$ be kept as small as possible. From Figure 3 it will be seen that the attenuating network is not a simple cascade of L-pads because of the presence of the metering resistance $Rm$ which causes some deviation of the input impedance. The ratio of $Rm$ to the bridge resistance should be kept as low as possible.

By forming the L-pads L1 and L2 of exponentially tapered potentiometers, instead of the multiple resistor arrangement of Figure 2, it is possible to include the meter resistance as a part of the shunt resistance of the circuit, and there will be no error due to the presence of the metering resistance. Figure 4 shows an L-pad constructed in this manner, and such an arrangement may be substituted for the two pads L1 and L2 in Figure 1. In this arrangement the series arm of the pad is formed of a fixed resistor $R_{1L}$ connected in series with an exponentially tapered potentiometer or variable resistor $R_{2L}$ between the terminals 7 and 8. The shunt arm of the pad also is formed of a fixed resistor $R_{1P}$ connected in series with an exponentially tapered variable resistor $R_{2P}$ between the terminals 8 and 9.

Figure 5:
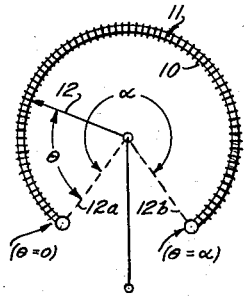
Figure 5 is a diagram of one of the potentiometers used in Figure 4.

Variable resistors $R_{2L}$ and $R_{2P}$ may be formed as shown in Figure 5 by winding a resistance wire 10 upon a winding form 11 arranged in the arc of a circle, and a rotary contact arm 12 is mounted at the center of the arc and makes wiping contact with the resistance wire. The winding form, which may be in the form of a thin strip of insulating material has a width which varies along its length to produce an exponentially tapered resistance which varies from zero in the position 12a of the arm 12 to a maximum in the position 12b. If $\theta$ is the angle between the position of the arm 12 and its initial position 12a, then $\theta$ will be zero in the position 12a and will have a value $\alpha$ in the position 12b which is the position of maximum resistance. The zero and maximum ends of the variable resistors $R_{2L}$ and $R_{2P}$ have been appropriately indicated in Figure 4 by marking the corresponding values of $\theta$.

The total resistance of the series arm is represented at $R_{oL}$ and the total resistance of the shunt arm is represented at $R_{oP}$. The two mov- The above table gives the resistance values for both the main bridge pad L1 and the instrument pad L2. This table also indicates the maximum resistance value $R_{oL}$ for the series arm and $R_{oP}$ for the shunt arm in each case, and the value at any intermediate setting of the adjustable arms can be calculated according to the exponential function given in the table.

Figure 6:
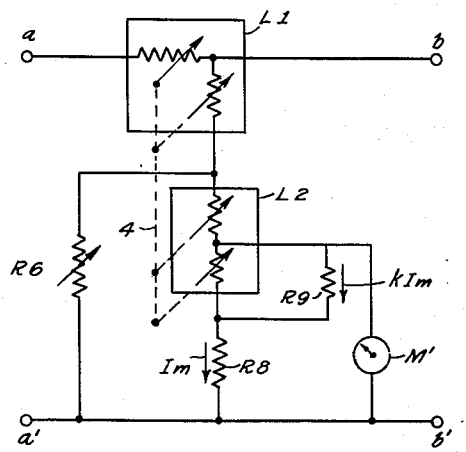
Figure 6 is a circuit diagram showing another form of attenuator network useful in my power measuring bridge and which employs a simple type of single-coil indicating instrument.

In Figure 6 I have shown a somewhat different arrangement of the attenuator network which may be employed in the power measuring bridge of Figure 1 for the measurement of power by the use of a simple type of single-coil indicating instrument, such as a millivoltmeter. This arrangement involves the use of two constant impedance L-pads L1 and L2 connected in the same manner as in Figure 1, but a fixed resistor R8 is connected in series with the shunt path, and a fixed shunt resistor R9 is connected in a branch circuit connected across the shunt arm of the pad L2 in the same manner as meter coil C is connected in Figure 1. A voltage measuring instrument M', such as a millivoltmeter, is connected to measure the sum of the voltage drops across the resistors R8 and R9. The voltage drop across R8 is proportional to $Im$, and the voltage drop across resistor R9 is proportional to $kIm$. Accordingly, the reading of the meter M' will be proportional to the radio frequency power. The arrangement must be such that the ratio of the load current to the input current for both pads will be equal for all settings of the pads. In other words, the pads must control the currents so that $kIm/Im$ is equal to $I_1/I_0$.

I claim:

1. A circuit for measuring high frequency power comprising a Wheatstone bridge having a bolometer element connected in one arm thereof, a source of direct current for biasing said bridge, a pair of lines connecting said source to diagonal points on said bridge, an attenuator interposed between said source and said bridge, said attenuator comprising a series arm connected in series with one of said lines and a shunt arm included in a path connected across said lines with means to simultaneously vary said arms to maintain the input impedance of the attenuator constant, and a direct current indicating meter having two operating coils, one of which is connected in series with the shunt path of said attenuator, and a second constant-impedance attenuator connected in series with said shunt path and energizing the other coil of said meter.

2. A measuring circuit according to claim 1 and including means for simultaneously varying said two attenuators to provide the same attenuation factor in each attenuator.

3. A circuit for measuring high frequency power comprising a Wheatstone bridge having a bolometer element connected in one arm thereof, a direct current circuit connected to diagonal points of said bridge for biasing said bridge, an attenuator of the constant input impedance type having a series arm connected in said biasing circuit and a shunt arm connected in a shunt path across said biasing circuit, a second attenuator of the constant input impedance type having a series arm and a shunt arm connected in series in said shunt path, a branch circuit connected across the shunt arm of said second attenuator, means for simultaneously varying said attenuators to maintain the same attenuation factor in each attenuator, and an indicating meter connected in said shunt path and controlled jointly by the current flowing in said branch circuit and the current flowing in said shunt path for indicating the high frequency power in said bolometer element.

4. A circuit for measuring high frequency power comprising a Wheatstone bridge having a bolometer element connected in one arm thereof, a direct current circuit connected to diagonal points of said bridge for biasing said bridge, an attenuator of the constant input impedance type having a series arm connected in said biasing circuit and a shunt arm connected in a shunt path across said biasing circuit, a second attenuator of the constant input impedance type having a series arm and a shunt arm connected in series in said shunt path, a resistor connected in series with said shunt path, a second resistor connected in shunt with the shunt arm of said second attenuator, means for simultaneously varying said attenuators to maintain the same attenuation factor in each attenuator, an indicating meter, and connections for energizing said meter in proportion to the sum of the voltages across said resistors.

5. A power measuring circuit according to claim 4 wherein one terminal of each of said resistors is connected to a common point, and said indicating meter comprises a voltage responsive meter connected across the remaining terminals of said resistors.

6. A power measuring device for use in a direct current biasing circuit of a Wheatstone bridge having a bolometer element connected in one arm thereof, said device comprising a pair of input terminals and a pair of output terminals, an attenuator of the constant input impedance type having a series arm connected between an input terminal and an output terminal and a shunt arm connected in a shunt path across said output terminals, a second attenuator of the constant input impedance type having a series arm and a shunt arm connected in series in said shunt path, a branch circuit connected across the shunt arm of said second attenuator, means for simultaneously varying said attenuators to maintain the same attenuation factor in each attenuator, and a power indicating meter connected in said shunt path and controlled jointly by the current flowing in said branch circuit and the current flowing in said shunt path.

7. A power measuring device for use in a direct current biasing circuit of a Wheatstone bridge having a bolometer element connected in one arm thereof, said device comprising a pair of input terminals and a pair of output terminals, an attenuator of the constant input impedance type having a series arm connected between an input terminal and an output terminal and a shunt arm connected in a shunt path across said output terminals, a second attenuator of the constant input impedance type having a series arm and a shunt arm connected in series in said shunt path, a resistor connected in series with said shunt path adjacent the shunt arm of said second attenuator, a second resistor connected in shunt with the shunt arm of said second attenuator, means for simultaneously varying said attenuators to maintain the same attenuation factor in each attenuator, and a voltage responsive indicating meter connected to the outside terminals of said two resistors and producing indications proportional to the sum of the voltages across said resistors.

8. A power measuring device for use in a direct current biasing circuit of a Wheatstone bridge having a bolometer element connected in one arm thereof, said device comprising a pair of input terminals and a pair of output terminals, a variable resistor connected between an input terminal and an output terminal, second and third variable resistors arranged in series in a shunt path across said output terminals, a resistive branch circuit connected across said third variable resistor, means for simultaneously varying said three variable resistors to maintain a constant ratio between the bridge current and the input current and the same ratio between the branch circuit current and the shunt path current, and a power indicating meter connected in said shunt path and controlled jointly by the current flowing in said branch circuit and the current flowing in said shunt path.

9. A power measuring device according to claim 8 and including a fixed resistor connected in said branch circuit and a second fixed resistor connected in said shunt path adjacent said first fixed resistor, and said indicating meter being connected to respond to the sum of the voltages across said fixed resistors.

HERBERT J. CARLIN.

REFERENCES CITED

The following references are of record in the file of this patent:

UNITED STATES PATENTS

| Number | Name | Date |
|---|---|---|
| 2,393,775 | Holmquist | Jan. 29, 1946 |
| 2,399,674 | Harrison | May 7, 1946 |
| 2,415,823 | Houghton | Feb. 18, 1947 |
| 2,417,820 | Ginzton | Mar. 25, 1947 |